United States Patent
Kunimatsu

(10) Patent No.: US 11,086,578 B2
(45) Date of Patent: Aug. 10, 2021

(54) NON-TRANSITORY COMPUTER-READABLE RECORDING MEDIUM, INFORMATION PROCESSING APPARATUS AND PRINTING METHOD FOR SELECTIVE DISTRIBUTED PRINTING BY A PLURALITY OF PRINTERS

(71) Applicant: BROTHER KOGYO KABUSHIKI KAISHA, Nagoya (JP)

(72) Inventor: Akihiro Kunimatsu, Okazaki (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/774,049

(22) Filed: Jan. 28, 2020

(65) Prior Publication Data
US 2020/0257479 A1 Aug. 13, 2020

(30) Foreign Application Priority Data
Feb. 7, 2019 (JP) .............................. JP2019-020972

(51) Int. Cl.
*G06F 3/12* (2006.01)
(52) U.S. Cl.
CPC ............ *G06F 3/1228* (2013.01); *G06F 3/121* (2013.01); *G06F 3/1234* (2013.01)
(58) Field of Classification Search
None
See application file for complete search history.

(56) References Cited

U.S. PATENT DOCUMENTS

| | | | |
|---|---|---|---|
| 7,061,635 B1* | 6/2006 | Wanda | G06F 3/1213 358/1.1 |
| 2009/0190151 A1* | 7/2009 | Ogino | H04N 1/00427 358/1.13 |
| 2010/0053664 A1* | 3/2010 | Mandel | G06F 3/124 358/1.15 |
| 2015/0181049 A1* | 6/2015 | Morishita | H04N 1/001 358/1.15 |
| 2017/0223210 A1 | 8/2017 | Yamada | |

FOREIGN PATENT DOCUMENTS

JP 2017-134718 A 8/2017

* cited by examiner

*Primary Examiner* — Thomas D Lee
(74) *Attorney, Agent, or Firm* — Scully Scott Murphy and Presser

(57) ABSTRACT

When a general-use printing program implemented in an OS of an information processing apparatus receives a print instruction, a supporting program implemented in a PC determines, based on a print parameter or image data indicating at least one image subjected to be printed, whether a distribution condition is satisfied. The distribution condition is a condition to execute distributed printing of the image data using a plurality of printers. When it is determined that the distribution condition is satisfied, the supporting program transmits a part of a total printing amount of a print job to a printer through a first port which is used by a general-use printing program and transmits a remaining part of the total amount of the print job to another printer through a second port.

17 Claims, 8 Drawing Sheets

| | DISTRIBUTION CONDITION | PRINTING AMOUNT | |
|---|---|---|---|
| (A) | MORE THAN 10 COPIES | FIRST DIVIDED PRINT JOB | 50% OF COPIES |
| | | SECOND DIVIDED PRINT JOB | 50% OF COPIES |
| (B) | MORE THAN 10 COPIES | DIVIDE EQUALLY IN ACCORDANCE WITH THE NUMBER OF PRINTERS | |
| (C) | MORE THAN 10 COPIES | PRINTER 2 (LOW SPEED) | 30% OF COPIES |
| | | PRINTER 3 (HIGH SPEED) | 70% OF COPIES |
| (D) | DISTRIBUTION FLAG ON | FIRST DIVIDED PRINT JOB | 50% OF COPIES |
| | | SECOND DIVIDED PRINT JOB | 50% OF COPIES |
| (E) | MORE THAN 100 COPIES | PRINTER 2 (LOW SPEED) | 30% OF PAGES |
| | | PRINTER 3 (HIGH SPEED) | 70% OF PAGES |
| (F) | MORE THAN 100 COPIES | 1~100 PAGES: ANOTHER PRINTER 101 PAGE AND AFTER: DESIGNATED PRINTER | |

FIG. 4

NON-TRANSITORY COMPUTER-READABLE RECORDING MEDIUM, INFORMATION PROCESSING APPARATUS AND PRINTING METHOD FOR SELECTIVE DISTRIBUTED PRINTING BY A PLURALITY OF PRINTERS

CROSS-REFERENCE TO RELATED APPLICATIONS

This application claims priority under 35 U.S.C. § 119 from Japanese Patent Application No. 2019-020972 filed on Feb. 7, 2019. The entire subject matter of the application is incorporated herein by reference.

BACKGROUND

Technical Field

The technical field disclosed in the present specification relates to a non-transitory computer-readable recording medium containing instructions realizing a supporting program which supports control of a printer, an information processing apparatus and a printing method.

Related Art

As a technique to control a printer from an information processing apparatus such as a personal computer, a configuration of installing a printer driver in the information processing apparatus, generating print data using the printer driver and transmitting the print data has been widely known. The printer driver is provided by a manufacturer of a printer and is adapted to various functions the printer has, and thus can make full use of the printer.

SUMMARY

Recently, a technique of controlling a printer using a printing program which is standardly implemented in an operating system (OS), without using the above-mentioned printer driver, has been in practical use. According to such a technique, upon detecting a printer, the OS associates the printer with the OS-standard printing program. Thereafter, it becomes possible that, when the OS receives a print instruction corresponding to the printer, printing is executed using the OS-standard printing program, without using the printer driver.

However, in the printing using the OS-standard printing program, print data is transmitted using a port that a predetermined printing program supports and printing is executed in a printer in accordance with a predetermined algorithm, but executed processes are not always the most suitable ones for the printer. Therefore, there are cases where it takes time to complete printing.

According to aspects of the present disclosure, there is provided a non-transitory computer-readable recording medium for an information processing apparatus. The information processing apparatus has a controller, and the recording medium contains computer-executable instructions realizing a supporting program corresponding to a printer connected to the information processing apparatus. The supporting program causes, when executed by the controller, the information processing apparatus to perform a port process. The port process includes a determination process in response to a general-use printing program implemented in an operating system of the information processing apparatus receiving a print instruction, the determination process being a process of determining whether a distribution condition is satisfied based on one of a print parameter indicated by the print instruction and image data indicating at least one image subjected to be printed by the print instruction, the distribution condition being a condition to execute distributed printing of the image data using a plurality of printers, and a distributing process of transmitting a part of a total printing amount of a print job indicted by the print instruction to one printer through a first port of the information processing apparatus and transmitting a remaining part of the total printing amount of the print job to an other printer different from the one printer through a second port of the information processing apparatus, the first port being a port to which the one printer is connected, the second port being a port different from the first port. In the port process, the distributing process is performed when it is determined that the distribution condition is satisfied in the determination process, and the distributing process is not performed when it is determined that the distributing condition is not satisfied.

BRIEF DESCRIPTION OF THE ACCOMPANYING DRAWINGS

FIG. 4 is a drawing showing examples of distribution conditions.

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
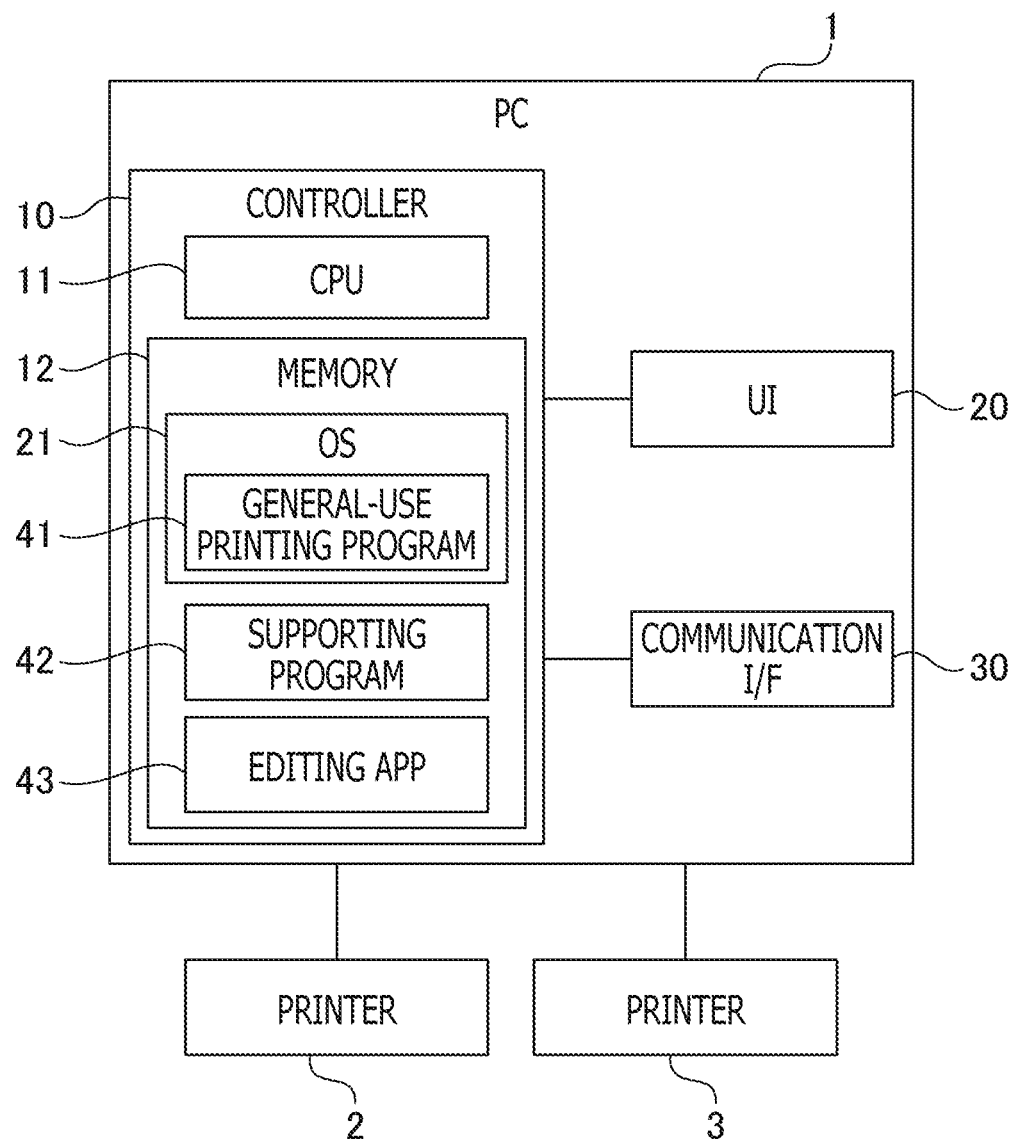
FIG. 1 is a block diagram showing an electrical configuration of a print system.

An example of a configuration of a print system in which programs according to a first embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard or a mouse having an input receiving function.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, Mac OS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer drive, which supplied by a printer vendor, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Next, configuration of the supporting program 42 according to the first embodiment and an example of printing procedure including an operation of the supporting program 42 will be described with reference to a sequential chart shown in FIG. 2. The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the images. Then, the editing APP 43 which received the print instruction delivers a print execution notification indicating contents of the received print instruction to the OS 21. It is noted that, in FIG. 2, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, print queue information for identifying a print queue, information indicating print parameters set with the APP, information indicating image data subjected to be printed, and information for identifying a user who instructed to execute printing. It is noted that, as will be described later, these pieces of information are used in the supporting program 42 as well.

Upon receiving the print execution notification, the general-use printing program 41 generates print data being data for printers (arrow C). The general-use printing program 41 executes several types of processes when generating the print data.

Specifically, the general-use printing program 41 generates intermediate image data by converting a format of the image data included in the print execution notification to a format of the intermediate image data and generates print job including the intermediate image data. There are various types of image data as the image data included in the editing APP 43, and the general-use printing program 41 converts the image data received from the editing APP 43 to the intermediate image data that is suitable for the generation of the print data. It is noted that, if the image data included in the print execution notification is suitable for the generation of the print data, generation of the intermediate image data may be omitted and the image data may be directly used as the intermediate image data. The intermediate image data is, for example, XPS format data.

Further, the general-use printing program 41 identifies a printer designated as a device to be caused to execute printing based on the information included in the print execution notification. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, before the general-use printing program 41 starts generating the print data, the general-use printing program 41 can output an execution command of processes of the supporting program 42 to activate the supporting program 42. In this case, the execution command is output from the general-use printing program 41 to the supporting program 42.

The supporting program 42 can execute a plurality of processes. For example, the supporting program 42 may execute a process for editing the print parameters and/or a process for editing an image of the intermediate image data after the generation of the intermediate image data and before starting the generation of the print data. For example, when editing the print parameters, the supporting program 42 reads out the print parameters, displays a setting screen regarding the read out print parameters on the UI 20, and receives changes in print parameters that have been set through the editing APP 43 and/or settings of print parameters that have not been received through the editing APP 43. Further, the supporting program 42 edits the print parameters of the print job based on contents received through the setting screen. The supporting program 42 may edit the print parameters by overwriting on the print parameters of the print job, or may edit the print parameters through the general-use printing program 41 by providing the general-use printing program 41 with the print parameters. When editing the image of the intermediate image data, the supporting program 42 may process the image of the intermediate image data in accordance with settings of the print parameters. The image processing includes, for example, aggregation of images, division of an image, magnification/reduction of an image, and combining of an image such as a watermark. When terminating each process, the supporting program 42 transmits an end notification of the process to the general-use printing program 41. Upon receiving the end notification, the general-use printing program 41 reflects the edited content to the print job.

In the present embodiment, after the generation of the intermediate image data, the general-use printing program 41 activates the support program 42 as necessary and then generates the print data based on the intermediate image data. The print data generated by the general-use printing program 41 is print data of a format that can be used in printing with various types of printers. The print data is, for example, PWG Raster data or PDF data.

After the generation of the print data, the general-use printing program 41 outputs an execution command of a print data editing process to the supporting program 42 (arrow D). The print parameters and the print data are attached to the execution command of the print data editing process.

The supporting program 42 which received the execution command from the general-use printing program 41 starts the print data editing process (arrow E). The print data editing process is executed after the generation of the print data by the general-use printing program 41 is completed. The supporting program 42 can obtain the generated print data in addition to the print parameters and the information of the printer from the general-use printing program 41 through the execution command of the print data editing process.

For example, as the print data editing process, the supporting program 42 edits the print data. For example, the supporting program 42 adds a command for causing the printer 2 to execute a function unique to the printer 2 to the print data. The function unique to the printer 2 includes, for example, a toner saving function and a finisher function. If the printer 2 has functions of adding watermarks, header/footer and the like to an image by itself, in the print data editing process, commands for causing the printer 2 to execute these functions may be added to the print data.

Then, the supporting program 42 executes a distribution determination on whether to execute a distributed printing (arrow F). In the print system of the first embodiment, when a print instruction to cause the printer 2 to execute printing of an image is input to the general-use printing program 41, the supporting program 42 can transmit the print data directly to the printer 2 in place of the general-use printing program 41 transmitting the print data to the printer 2. The above-described print data transmission executed by the supporting program 42 on behalf of the general-use printing program 41 is herein referred to as the "substitutive transmission". The supporting program 42 further divides the print job in a printing amount, transmits a part of the printing amount of the print job to the printer 2, and transmits the remaining of the printing amount of the print job to another printer (in case of the present embodiment, to the printer 3) by using the substitutive transmission. The above-described printing which divides one print job to a plurality of printers, and cause a plurality of printers to execute printing of the divided print jobs is herein referred to as the "distributed printing". It is noted that both the print data transmission by the supporting program 42 and the print data transmission by the general-use printing program 41 are actually executed through communication control by the OS 21. However, in the description, the communication control by the OS 21 is omitted.

Figure 3:
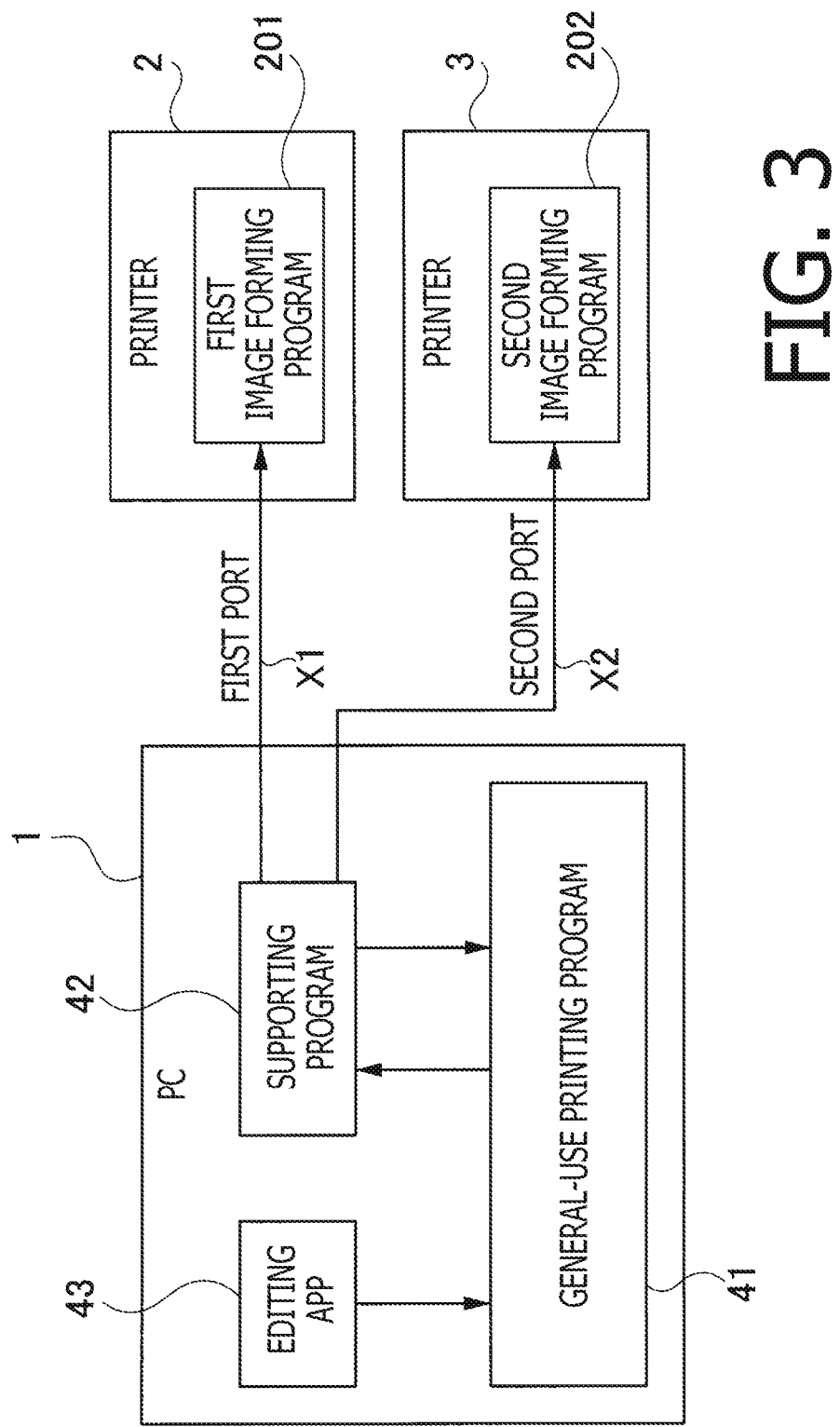
FIG. 3 is a drawing showing an outline of a distributed printing in a first embodiment.

Even when executing the distributed printing, as shown in FIG. 3, the supporting program 42 is activated as the editing APP 43 inputs the print execution notification to the general-use printing program 41 and the general-use printing program 41 outputs the execution command to the supporting program 42. The supporting program 42 obtains the print parameters and the print data from the general-use printing program 41 and divides one print job into two print jobs.

The print system of the first embodiment supports at least two paths as paths for transmitting the divided print jobs, namely, a first path X1 for transmitting a first divided print job through a first port and a second path X2 for transmitting a second divided print job through a second port. When executing the substitutive transmission, a path for transmitting each of the divided print jobs is determined by selecting a port.

In the print system of the first embodiment, among the ports to be selected by the supporting program 42, the first port is a port that the general-use printing program 41 uses for communication with a printer and is a port that is set to communicate using, for example, the IPP (Internet Printing Protocol). Specifically, the OS 21 is configured such that the general-use printing program 41 uses the first port for transmitting a print command to a printer. That is, when the general-use printing program 41 instructs a printer to execute printing without using the supporting program 42, the first port is used for transmitting a print command.

On the other hand, the second port is a port that the general-use printing program 41 does not use and is a port that is generally used in printing. For example, the second port is a port that is set to be used for RAW printing using the TCP or UDP port 9100. It is noted that the ports that are presented in the present embodiment are mere examples and thus other ports may be used. For example, as the second port, ports of other networks or ports other than those in the network, such as a USB port and a wireless communication port, may be used.

When the printer 2 receives the first divided print job transmitted from the first port, the printer 2 executes image processing based on print data of the received first divided print job using a first image forming program 201. When the printer 3 receives the second divided print job transmitted from the second port, the printer 3 executes image processing based on print data of the received second divided print job using a second image forming program 202. Each of the first image forming program 201 and the second image forming program 202 is a program for executing image processing based on the print data transmitted from a corresponding port and is configured to execute processes in accordance with algorithms suitable for the print data.

In the first embodiment, the distribution determination on whether to execute the distributed printing is executed, in accordance with whether a particular distribution condition is satisfied, based on the print parameters or the print data received from the general-use printing program 41. FIG. 4 shows examples of the distribution conditions. For example, in the present embodiment, as shown in (A) of FIG. 4, whether number of copies is equal to or more than 10 is set as a distribution condition. That is, when the number of copies is equal to or more than 10, the distribution condition is satisfied. The larger the number of copies, the greater the time to complete printing. Therefore, it is expected that printing can be completed faster by executing the distributed printing. It is noted that the number of copies indicated in FIG. 4 is merely an example of a threshold value and thus the threshold value is not limited to 10.

Information indicating the number of copies may be included in the print parameters, in a header area, such as a job header, of the intermediate image data, in header areas, such as page headers, of respective pages of the intermediate image data, in a header area of the print data, or in header areas of respective pages of the print data.

Therefore, a timing for obtaining the information indicating the number of copies differs depending on where the information is included. If the information is included in the print parameters, the supporting program 42 can obtain the information indicating the number of copies at the time when the print parameters become possible to be obtained by the supporting program 42 for the first time, that is, immediately after the supporting program 42 is invoked by the general-use printing program 41. If the information is included in the header area of the intermediate image data, the supporting program 42 can obtain the information indicating the number of copies after the general-use printing program 41 generated the intermediate image data. If the information is included in the print data, the supporting program 42 can obtain the information indicating the number of copies after the general-use printing program 41 generated the print data.

It is noted that the division of a print job based on the number of copies becomes possible after print data for all the pages to be printed is generated. Therefore, if the information indicating the number of copies is included in the print parameters, a timing for executing the distribution determination based on the number of copies may be after the supporting program 42 obtained the print parameters for the first time. If the information indicating the number of copies is included in the intermediate image data, a timing for executing the distribution determination may be after the general-use printing program 41 generated the intermediate image data. If the information indicating the number of copies is included in the print data, a timing for executing the distribution determination may be after the general-use printing program 41 generated the print data.

It is noted that a manner of division of the printing of a print job is not limited to the example (A) shown in FIG. 4. For example, as indicated in the condition (B) shown in FIG. 4, the printing amount of the print job may be divided equally in accordance with the number of printers. That is, the number of division is not limited to two and thus, for example, if three printers are connected to the PC 1, the number of division may be three. Also, as shown in the condition (C) of FIG. 4, printing amounts of respective divided print jobs may be determined in accordance with capabilities of printers. For example, if processing speed of the printer 3 is faster than that of the printer 2, the printing amount of the print job may be divided such that printing amount of the printer 3 becomes greater than that of the printer 2.

Apart from the determination based on the number of copies described above, if, for example, the print parameters include a parameter (e.g., a flag) indicating a setting on whether the distributed printing is possible as shown in the condition (D) of FIG. 4, the distribution determination may be executed in accordance with the parameter. Furthermore, information concerning whether the distributed printing is possible may be stored, as a setting of the supporting program 42, in a memory area where the supporting program 42 can use, and the distribution determination may be executed in accordance with the stored setting. A timing of the distribution determination based on the setting on whether the distributed printing is possible may be the same as the timing for the distribution determination based on the number of copies included in the print parameters.

The print data may indicate multiple images respectively printed on multiple pages. In that case, a distribution condition may also be set based on a number of multiple pages. For example, as shown in the condition (E) of FIG. 4, whether number of pages is equal to or more than 100 may be set as a distribution condition. The larger the number of pages, the greater the time to complete printing. Therefore, it is expected that printing can be completed faster by executing the distributed printing. It is noted that the number of pages indicated in the condition (E) is merely an example of a threshold value and thus is not limited to 100 pages. In case both-side printing is to be executed, the number of pages for the threshold value is halved (e.g., the threshold value may be 50 pages). If an aggregation for printing N pages in one sheet is set in the print parameters, the actual number of printing pages will be fixed after the processing of the intermediate image data regarding the aggregation by the general-use printing program 41 is completed. Therefore, a timing for executing the distribution determination based on the number of pages may be after the processing of the intermediate image data is completed, after the generation of the intermediate image data and before the generation of the print data if no process of the intermediate image data is needed, or after the generation of the print data.

It can be determined whether to execute the distributed printing by using at least one of the distribution conditions shown in FIG. 4. It is noted that a plurality of distribution conditions may be combined. In this case, it can be determined whether to execute the distributed printing or not by setting priorities to the distribution conditions.

If it is determined to execute the distributed printing, the supporting program 42 divides an original print job of which printing has been instructed by the editing APP 43 into the first divided print job and the second divided print job. If a printing amount of the original print job is divided based on the number of copies, print data for the first divided print job and print data for the second divided print job become the same, and the sum of the number of copies of the first divided print job and the number of copies of the second divided print job equals to the number of copies of the original print job. That is, the sum of a printing amount of the first divided print job and a printing amount of the second divided print job equals to the printing amount of the original print job.

Then, the supporting program 42 transmits the first divided print job to the printer 2 through the first port without using the general-use printing program 41 (arrow M1). The printer 2 which received the first divided print job executes image processing using the first image forming program 201, and executes printing of an image indicated by the print data of the received first divided print job (arrow O1). The printer 2 is a printer which is designated by the original print job and, from the first port, the first divided print job is transmitted to the printer which is designated by the original print job.

The supporting program 42 further transmits the second divided print job to the printer 3 through the second port without using the general-use printing program 41 (arrow N1). The printer 3 which received the second divided print job executes image processing using the second image forming program 202, and executes printing of an image indicated by the print data of the received second divided print job (arrow O2). The printer 3 is a printer which is not designated by the original print job and, from the second port, the second divided print job is transmitted to the printer which is not designated by the original print job.

It is noted that, when transmitting the print data of the second divided print job through the second port, the supporting program 42 may edit the print data. For example, the supporting program 42 may add commands for the second image forming program 202 to the print data, or may optimize the print data for the second image forming program 202. Such editions of the print data may be executed before or after the distribution determination.

Furthermore, since the divided print jobs are directly transmitted from the supporting program 42 to respective the printers, a complete notification is input from the supporting program 42 to the general-use printing program 41 (arrow G1). Upon receiving the complete notification, the general-use printing program 41 executes a completing process in accordance with the complete notification (arrow P1). Specifically, the general-use printing program 41 terminates the original print job being based on the print execution notification input from the editing APP 43. At this time, the general-use printing program 41 stores information indicating that the print job to be terminated has been normally terminated in the memory 12 as history of the print job. Information indicating that the distributed printing has been executed may also be stored as the history. It is preferable that the information indicating that the distributed printing has been executed includes, for example, information concerning printers to which the print job has been transmitted and information concerning ports that has been used in the transmission.

It is noted that the supporting program 42 can also input a cancel notification indicating that a print job has been cancelled to the general-use printing program 41. For example, the supporting program 42 can receive cancelling of a print job through the setting screen for receiving editions of the print parameters and can input the cancel notification to the general-use printing program 41. The supporting program 42 can also input the cancel notification to the general-use printing program 41 in case the supporting program 42 failed to edit the intermediate image data. The receipt of cancelling of the print job and the failure of edition of the intermediate image data are examples of a cancel condition. The general-use printing program 41 to which the cancel notification is input terminates the print job as in the case where the complete notification is received. However, when the cancel notification is input, differently from the case where the complete notification is received, the general-use printing program 41 stores information indicating that the print job has been cancelled in the memory 12 as the history of the print job. That is, in case the transmission of the print data has been executed by the substitutive transmission, the complete notification different from the cancel notification is input from the supporting program 42 to the general-use printing program 41 as a notification to terminate the print job. The complete notification is an example of a first end notification, and the cancel notification is an example of a second end notification.

If it is determined not to execute the distributed printing, the supporting program 42 returns an end notification indicating the end of the print data editing process to the general-use printing program 41 and terminates the process. In response to receiving the end notification from the supporting program 42, the general-use printing program 41 transmits a print command to the printer 2. The printer 2 which received the print command executes printing of an image indicated by print data attached to the print command in accordance with the print data.

It is noted that the method for instructing the distributed printing by the supporting program 42 may differ depending on models of printers to be used for the distributed printing. For example, in case low-priced printers with small memory capacities are to be used for the distributed printing, the supporting program 42 obtains print data for one copy generated by the general-use printing program 41 and transmits the print data to each of the printers repeatedly for the number of copies to be printed by the printer. On the other hand, in case high-priced printers with large memory capacities are to be used for the distributed printing, after obtaining the print data for one copy generated by the general-use printing program 41, the supporting program 42 edits the print data for each of the printers to add a command indicating a number of copies to be printed by the printer and transmits the edited data to the printer. The command may for example be included in the header area of the print data or in header areas of respective pages. In case the supporting program 42 corresponds to a plurality of models (e.g., the supporting program 42 is adapted to the plurality of models), the supporting program 42 may use the above-described methods for instructing the distributed printing properly in accordance with models of printers to be used for the distributed printing. The proper way of using the methods for the distributed printing in accordance with models of printers has been described while taking the case where the distribution determinations is made based on the number of copies as an example. However, even in a case where, for example, the distribution determinations is made based on the number of pages, the above-described methods for the distributed printing can also be used properly in accordance with models of printers.

Figure 5:
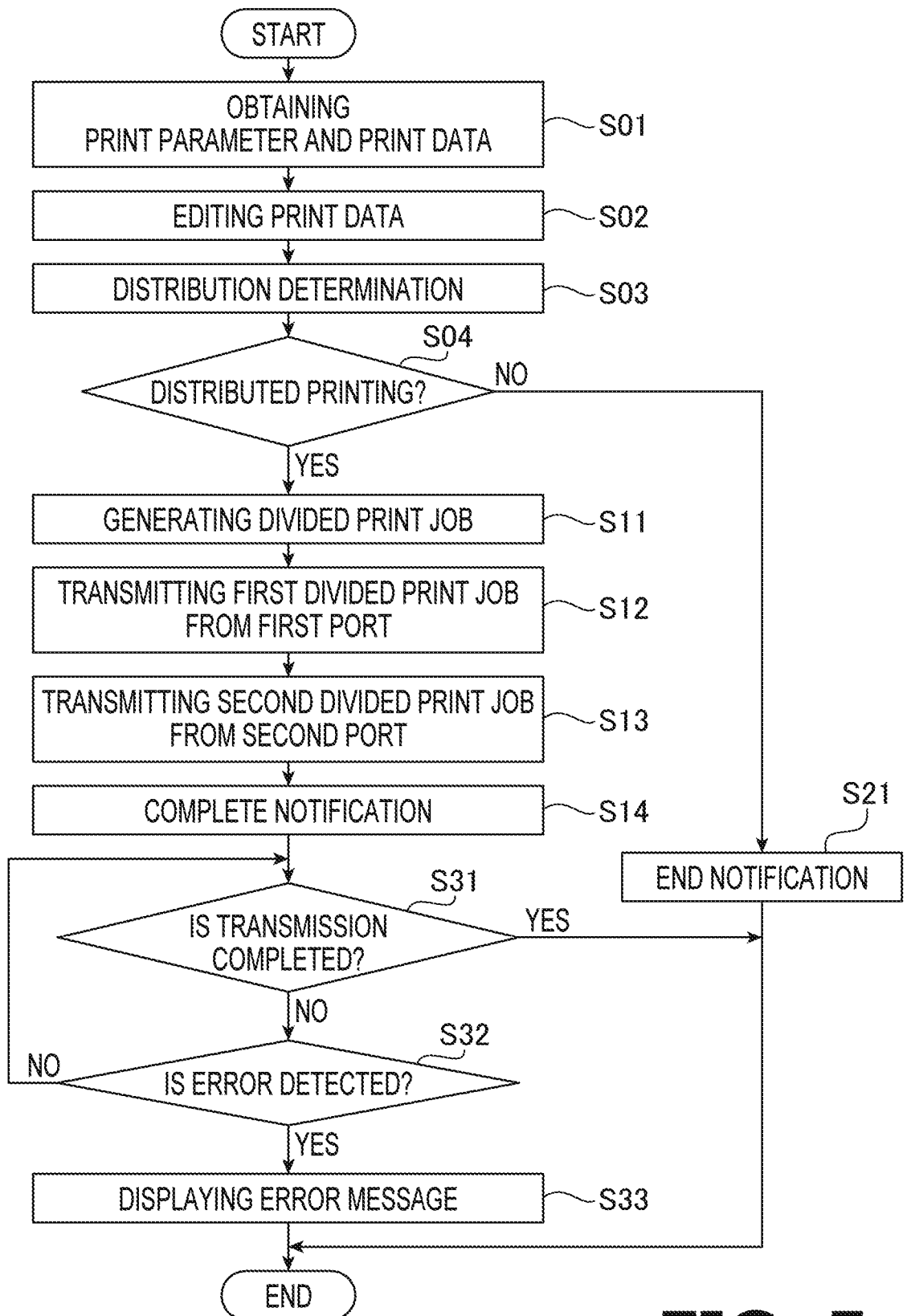
FIG. 5 is a flowchart showing a procedure of processes by a supporting program of a first embodiment.

Next, a procedure of the print data editing process by the supporting program 42 when executing the above-described distributed printing will be described with reference to a flowchart shown in FIG. 5. The print data editing process is executed by the CPU 11 of the PC 1 upon receiving the execution command of the print data editing process from the general-use printing program 41 based on the print instruction. The print data editing process is an example of a port process.

In the print data editing process, the CPU 11 obtains print parameters and print data corresponding to the execution command (S01). Then, the CPU 11 edits the obtained print data (S02). For example, in S02, the CPU 11 adds, to the printer 2 to the print data, a command for causing the printer 2 to execute a function unique. The functions unique to the printer 2 include, for example, a both-side printing function, a toner save function and a finisher function. If the printer 2 has functions of adding watermarks, header/footer and the like to an image by itself and/or functions of changing an image size such as an aggregation function and a magnification/reduction function, commands for causing the printer 2 to execute these functions may be added to the print data in S02. It is noted that, depending on the print parameters, the process of S02 need not be executed. S02 corresponds to the arrow E shown in FIG. 2.

The CPU 11 executes the distribution determination based on the print parameters or the print data received from the general-use printing program 41 (S03). The process of S02 and the process of S03 may be executed in inverse order or may be executed at the same time. S03 corresponds to the arrow F shown in FIG. 2. In the distribution determination, the above-described distribution condition is used. Then, the CPU 11 determines whether to execute the distributed printing in accordance with the determination result in S03 (S04). S03 and S04 are examples of a determination process.

If it is determined to execute the distributed printing (S04: YES), the CPU 11 generates the first divided print job and the second divided print job based on the print parameters and the print data (S11). Specifically, the supporting program 42 has a table 51 such as the one shown in FIG. 4 in which the distribution conditions and distribution manners of the printing amount are associated and, in S11, the supporting program 42 reads out the table 51. Then, the supporting program 42 divides the print job received from the general-use printing program 41 in accordance with the table 51. For example, in case (A) shown in FIG. 4 is used as the distribution condition, if the number of copies is equal to or more than 10, the supporting program 42 determines to execute the distributed printing, sets a printing amount of the first divided print job which uses the first port to 50% of a printing amount of the original print job, and sets a printing amount of the second divided print job which uses the second port to 50% of the printing amount of the original print job. For example, if the number of copies is set in the print parameters or a command designating the number of copies is set in the header area of the print data and if the set number is more than two (i.e., two or more copies are required by the print parameters or the command), the supporting program 42 divides the number of copies in to a first number of copies and a second number of copies such that they becomes 50% of the number of copies of the original print job, includes a command designating the first number of copies in a header area of the first divided print job, and includes a command designating the second number of copies in a header area of the second divided print job. Or, if the printers do not have enough memory capacities and thus cannot operate even if the command designating the number of copies is received, the supporting program 42 does not use the command designating the number of copies but transmits the print data to respective printers repeatedly for respective numbers of copies. Which of the distribution conditions is to be used may be set in the supporting program 42 in advance or may be selected by the user.

Then, before returning to the process of the general-use printing program 41, the CPU 11 transmits the first divided print job to the printer 2 through the first port as a process by the supporting program 42 (S12). Before returning to the process of the general-use printing program 41, the CPU 11 further transmits the second divided print job to the printer 3 through the second port as a process by the supporting program 42 (S13). S12 and S13 may be executed in inverse order or may be executed at the same time. S12 and S13 are examples of a distributing process.

The CPU 11 also inputs the complete notification to the general-use printing program 41 (S14). The process of S14 and the processes of S12 and S13 may be executed in inverse order or may be executed at the same time. The complete notification is an example of the first end notification, and S22 is an example of a first notification process.

On the other hand, if it is determined not to execute the distributed printing (S04: NO), the CPU 11 inputs, to the general-use printing program 41, an end notification indicating that the print data editing process has been normally terminated (S21), and terminates the print data editing process. In this case, the general-use printing program 41 transmits the print data edited at S02 to the printer 2.

After S14, the CPU 11 determines whether the transmissions of the first divided print job and the second divided print job have been completed (S31). If the transmissions of the two divided print jobs have not been completed (S31: NO), the CPU 11 determines whether an error has been detected during the transmission of the first divided print job or the second divided print job (S32). If no error has been detected (S32: NO), the CPU 11 returns to the process S31 and repeats the processes until completion of the transmissions of the two divided print jobs or an error during the transmissions is detected.

If an error is detected during the transmission of the first divided print job or the second divided print job (S32: YES), the CPU 11 causes the UI 20 to display a message indicating the error (S33). By displaying the error message using the supporting program 42, the user can recognize the error. S33 is an example of an error process. After S33, or when the transmission of the print data is completed (S31: YES), the CPU 11 terminates the print data editing process.

It is noted that the OS 21 has one or more print queues, each being associated to a printer and a port. For example, in the first embodiment, the OS 21 has two print queues for one printer 2, namely, a print queue associated to the printer 2 and the first port and a print queue associated to the printer 2 and the second port. The OS 21 has a function of sequentially transmitting print jobs registered to respective print queues to the printer. Therefore, the first divided print job and the second divided print job may be made to be transmitted automatically by the OS 21 by registering the first divided print job and the second divided print job to respective print queues directly from the supporting program 42 without using the general-use printing program 41.

Next, the second embodiment will be described. In the second embodiment, the distribution determination is executed before the generation of the print data.

A procedure when executing the distributed printing in the second embodiment will be described with reference to FIG. 6. It is noted that, in FIG. 6, processes identical to those in FIG. 2 are assigned the same numerals as in FIG. 2. Processes up to the receipt of the print execution notification by the general-use printing program 41 (arrow B) are identical to those in the first embodiment and thus descriptions thereof are herein omitted.

Upon receiving the print execution notification, before generating the print data, the general-use printing program 41 outputs an execution command for causing the supporting program 42 to execute an editing process for editing the print parameters (arrow C1). The supporting program 42 which received the execution command from the general-use printing program 41 edits the print parameters as the editing process (arrow J1) and then executes the distribution determination (arrow J2).

In the second embodiment, the distribution determination is executed based on the distribution condition (F) shown in FIG. 4. If it is determined to execute the distributed printing, before completing obtaining of image data corresponding to a total printing amount of an original print job for which a print instruction has been received through the editing APP 43, the supporting program 42 starts generating pieces of divided image data each corresponding to a part of the total printing amount by dividing the received image data (arrow J3). That is, the supporting program 42 firstly generates a piece of divided image data for up to page 100 and then generates a piece of divided image data for page 101 and after. It is noted that the division of the image data may be executed after converting the image data into the intermediate image data or the image data may be converted into the intermediate image data after the division. Description of a case where it is determined not to execute the distributed printing is herein omitted.

Then, the supporting program 42 delivers, to the general-use printing program 41, a print execution notification to print images of one of the two pieces of divided image data (arrow K). That is, a new print execution notification is input from the supporting program 42 to the general-use printing program 41. To this print execution notification, the print parameters and one of the two pieces of divided image data are attached. Port information indicating the second port and printer information indicating the printer 3 being a destination of the transmission are also attached to this print execution notification. Processes by the general-use printing program 41 which received the print execution notification will be described later.

After delivering the print execution notification to the general-use printing program 41, the supporting program 42 which executed the distribution determination edits the other of the two pieces of divided image data after converting it to the intermediate image data (arrow J4), returns an end notification indicating the end of the editing process to the general-use printing program 41 (arrow I) and terminates the process. To this end notification, apart from the edited intermediate image data, port information indicating the first port and printer information indicating the printer 2 being a destination of the transmission are also attached.

In response to receiving the end notification from the supporting program 42, the general-use printing program 41 generates print data (arrow C). The print data to be generated at this time is print data corresponding to the other of the two pieces of divided image data that was generated afterward. After the generation of the print data, the general-use printing program 41 outputs an execution command for executing the print data editing process on the print data (arrow D1). The port information and the printer information attached to the end notification (i.e., the port information indicating the first port and the printer information indicating the printer 2) are also attached to this execution command.

Then, the supporting program 42 edits the print data (arrow E). Provided that the port information is attached to the execution command, the supporting program 42 generates a print job for printing images of the edited print data, that is, the first divided print job being a print job for executing printing of a part of the original print job. Then, the supporting program 42 transmits the first divided print job to the printer 2 indicated by the printer information through the first port indicated by the port information without using the general-use printing program 41 (arrow M2). The printer 2 which received the first divided print job executes printing of images indicated by the print data of the received first divided print job (arrow O1).

Further, a complete notification is input from the supporting program 42 to the general-use printing program 41 (arrow G2). The general-use printing program 41 which received the complete notification executes a completing process in accordance with the complete notification (arrow P2).

Figure 7:
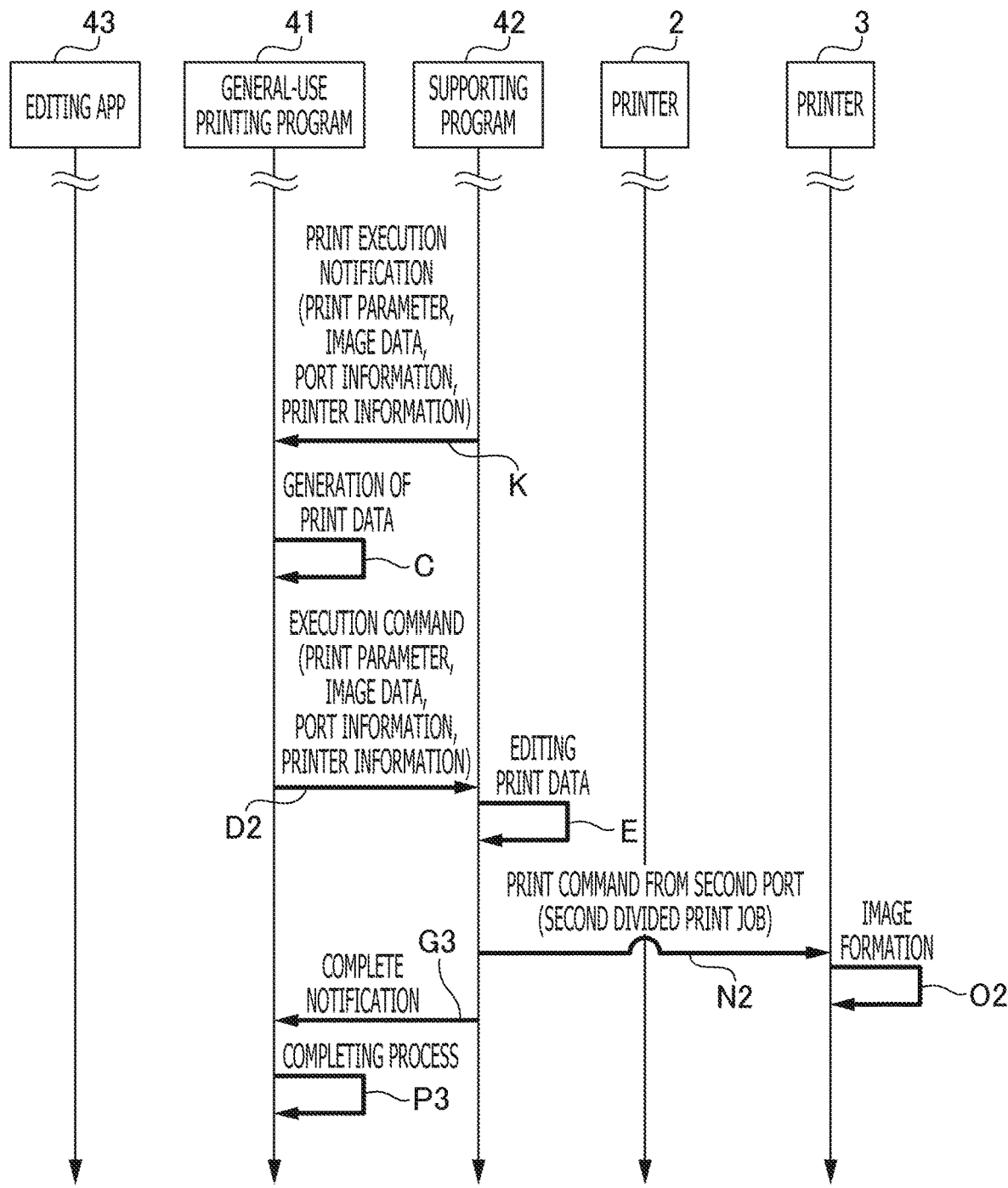
FIG. 7 is a sequential chart showing a procedure of the distributed printing in the second embodiment when a new supporting program is activated.

On the other hand, the supporting program 41 which received the print execution notification executes various processes concerning one of the two pieces of divided image data that was generated first. FIG. 7 shows a procedure of processes to be executed in response to the general-use printing program 41 receiving, from the supporting program 42, the print execution notification to which the port number is attached. As described above, the port information indicating the second port and the printer information indicating the printer 3 are attached to the print execution notification.

Upon receiving the print execution notification to which the port number is attached (arrow K), the general-use printing program 41 generates print data based on the print parameters and the image data attached to the print execution notification (arrow C). Then, the general-use printing program 41 outputs an execution command for executing the print data editing process on this print data (arrow D2). To this execution command, the port number and the printer information attached to the print execution notification are attached. If the supporting program 42 corresponding to the printer 2 and the supporting program 42 corresponding to the printer 3 are different programs, the general-use printing program 41 activates the supporting program 42 corresponding to a model of the printer 3.

Then, the supporting program 42 which received the execution command from the general-use printing program 41 edits the print data (arrow E). Provided that the port information or the printer information is attached to the execution command, the supporting program 42 generates a print job for printing images of the edited print data, that is, the second divided print job being a print job for executing printing of a part of the original print job. Then, the supporting program 42 transmits the second divided print job to the printer 3 indicated by the printer information through the second port indicated by the port information without using the general-use printing program 41 (arrow N2). The printer 3 which received the second divided print job executes printing of images indicated by the print data of the received second divided print job (arrow O2).

Further, a complete notification is input from the supporting program 42 to the general-use printing program 41 (arrow G3). The general-use printing program 41 which received the complete notification executes a completing process in accordance with the complete notification (arrow P3).

Figure 6:
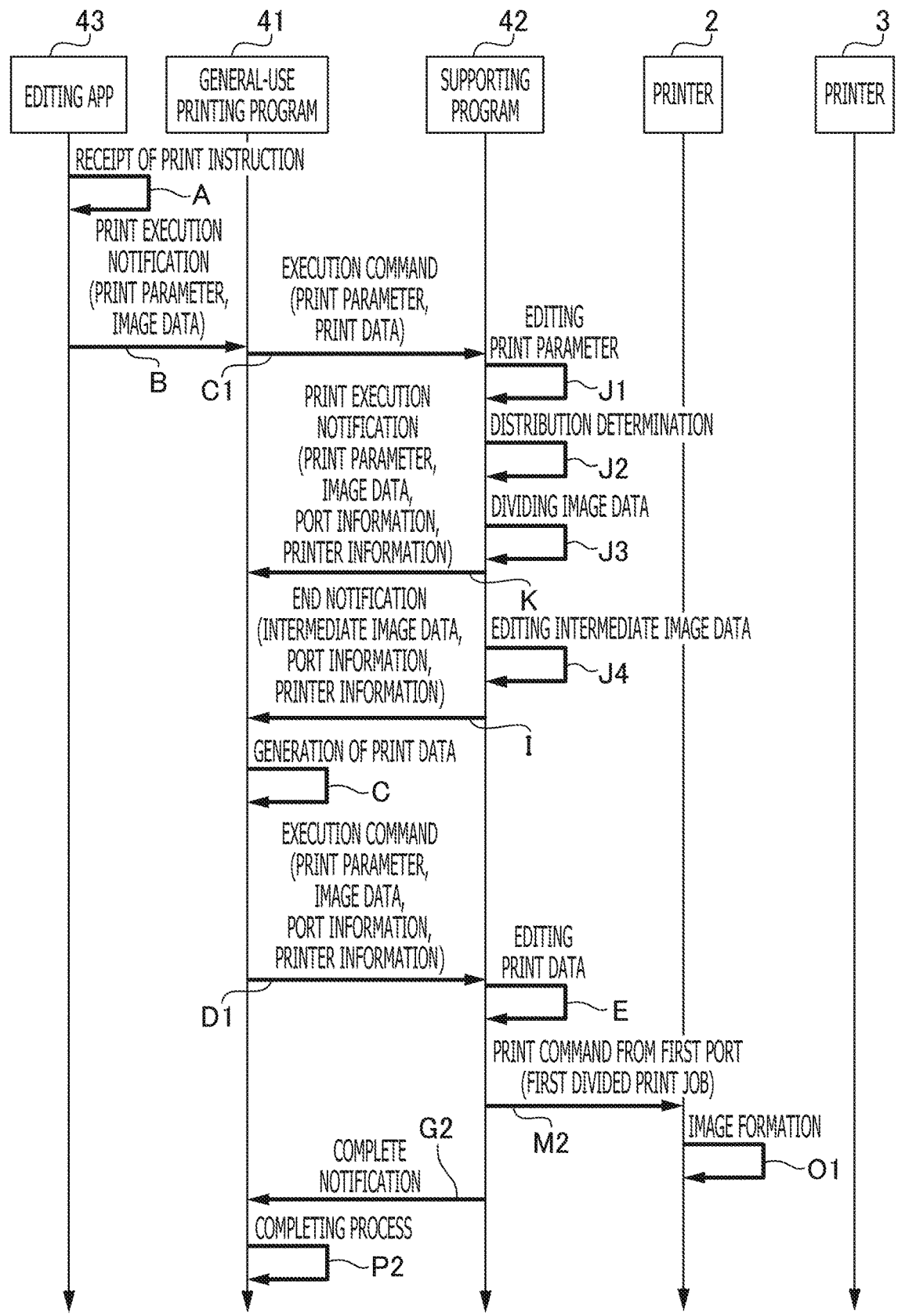
FIG. 6 is a sequential chart showing a procedure of the distributed printing in a second embodiment.

In the second embodiment, since, as shown at the arrow J3 in FIG. 6, the division of the image data and the processes on and after the arrow K, that is, controls for transmitting the divided print jobs, are started at an early stage before completion of the generation of the print data, it is expected that printing by printers is started earlier than the first embodiment. For example, in case of a print job of which the number of pages is 150 pages, if image data for up to page 100 is obtained, a divided print job for up to page 100 can be generated and a print command for the divided print job can be transmitted without waiting obtaining of image data for up to 150 page. However, in the above-described first embodiment, since the division of image data is executed after the generation of print data, and since the distribution conditions are based on the number of copies, that is, the image data cannot be divided in the distribution condition, division of a print job cannot be executed until the image data for 150 pages is obtained. Therefore, in the first embodiment, start of printing of the divided print job is late as compared to the second embodiment. On the other hand, in the first embodiment, the print data generating process only needs to be executed once at the arrow C shown in FIG. 2, but in the second embodiment, the print data generating process needs to be executed twice, that is, at the arrow C shown in FIG. 6 and at the arrow C shown in FIG. 7. Therefore, the process is simpler in the first embodiment than in the second embodiment.

In the second embodiment, since the supporting program 42 for the printer 3 is activated at the arrow D2 shown in FIG. 7, even if the supporting program 42 adapted to the printer 2 and the supporting program 42 adapted to the printer 3 are different programs, it is possible to activate different supporting programs 42. Therefore, it is possible to transmit the divided print jobs to printers of which corresponding supporting programs 42 are different.

It is noted that a divided print job that is newly generated by the supporting program 42 and is to be transmitted through the second port may be made to be transmitted through the second port automatically by the OS 21 by registering the divided print job with a print queue directly from the supporting program 42 without using the general-use printing program 41.

In the second embodiment, divided printing is executed by a series of processing at arrows C1~M2 shown in FIG. 6 in response to the first print execution notification (arrow B) and a series of processing at arrows C~N2 shown in FIG. 7 in response to a subsequent print execution notification (arrow K). Specifically, in the second embodiment, the second divided print job to be transmitted in response to the print execution notification (arrow K) is transmitted through the second port (arrow N2), and the first divided print job to be transmitted in response to the end notification (arrow I) is transmitted through the first port (arrow M2). However, the second divided print job to be transmitted in response to the print execution notification may be transmitted through the first port, and the first divided print job to be transmitted in response to the end notification may be transmitted through the second port.

In the second embodiment, the second divided print job to be transmitted in response to the print execution notification is transmitted to the printer 3, and the first divided print job to be transmitted in response to the end notification is transmitted to the printer 2. However, the second divided print job to be transmitted in response to the print execution notification may be transmitted to the printer 2, and the first divided print job to be transmitted in response to the end notification may be transmitted to the printer 3.

It is noted that a supporting program executing processes of arrows J1~I, E and M2 shown in FIG. 6 and a supporting program executing processes of arrows E and N2 shown in FIG. 7 may be different from each other.

Figure 8:
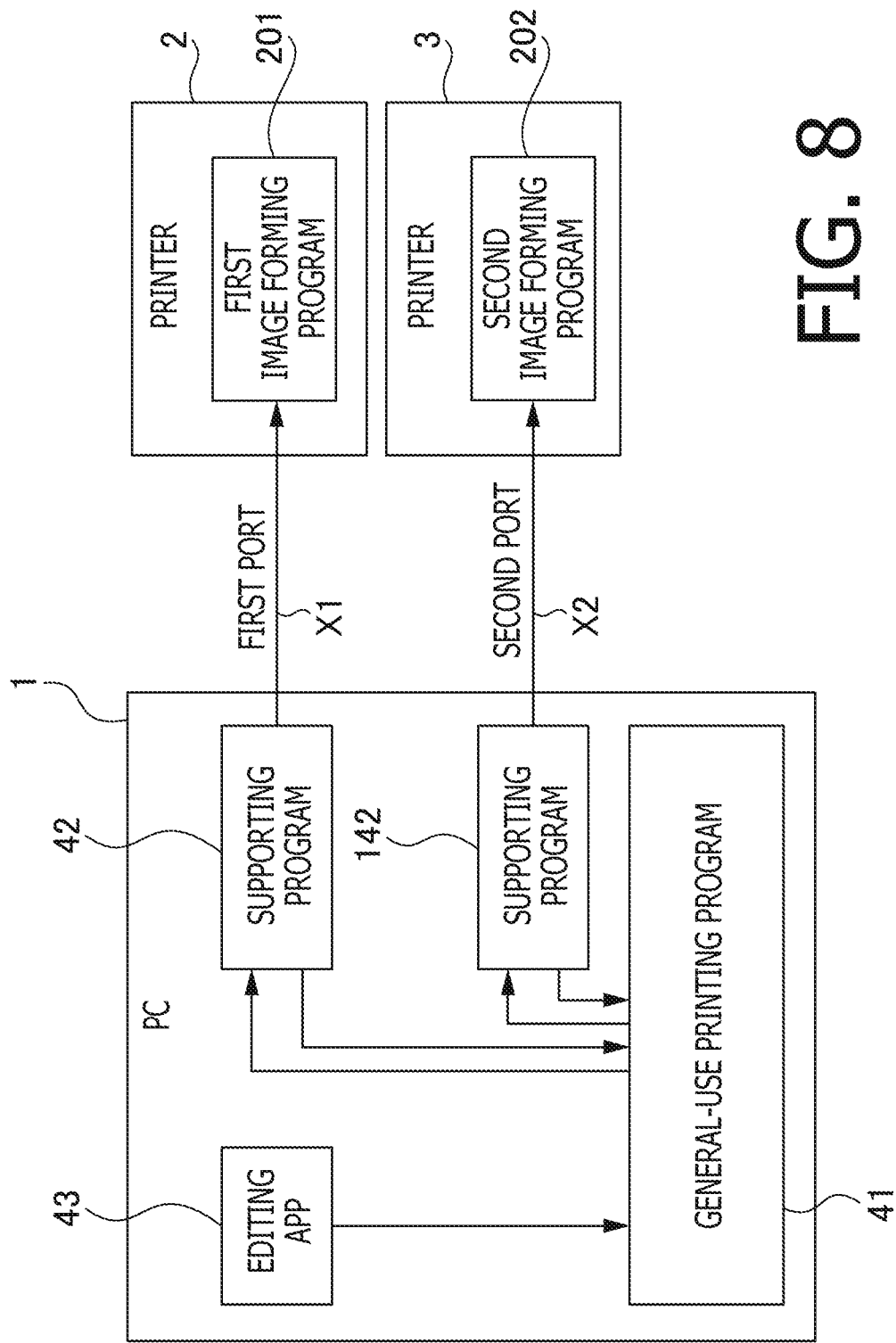
FIG. 8 is a drawing showing an outline of a distributed printing in another embodiment.

For example, as shown in FIG. 8, there is a case where the supporting program 42 corresponding to the printer 2 and the supporting program 142 corresponding to the printer 3 are implemented in the PC 1. For example, the supporting program 42 is connected to the printer 2 through the first port and the supporting program 142 is connected to the printer 3 through the second port. In that case, the print execution notification, which is output from the supporting program 42 to the general-use printing program 41 in the process at arrow K of FIG. 6 and FIG. 7, may include the port information indicating the second port and/or the printer information indicating the printer 3. The general-use printing program 41 generates the print data and output the execution command to the supporting program 142 in response to receipt of the print execution notification. The supporting program 142 edits the print data and transmits the print command to the printer 3 in response to receipt of the execution command.

Further, a supporting program executing processes of arrows J1~J3 shown in FIG. 6, a supporting program executing processes of arrows J4 shown in FIG. 6, a supporting program executing processes of arrows E~M2 shown in FIG. 6, and a supporting program executing processes of arrows E~N2 shown in FIG. 7 may be different programs.

Next, the third embodiment will be described. In the third embodiment, in accordance with which of the distribution conditions a print job satisfies, it is determined whether to generate the divided print jobs before generating the print data or to generate the divided print jobs after generating the print data.

As described above, the distribution conditions include, for example, distribution conditions that are possible to divide target image data such as conditions based on the number of pages, and distribution conditions that are not possible to divide the target image data such as conditions based on the number of copies. The "target image data" in this specification indicates image data for all the pages of a print job if the print job consists of a plurality of pages. For example, if a print job consists of 150 pages, the "target image data" indicates image data for 150 pages. In case of the print job consisting of 150 pages, with the distribution conditions based on the number of pages, for example, image data of the print job can be divided into image data for the first 100 pages and image data for the latter 50 pages. Therefore, the distribution conditions based on the number of pages are distribution conditions that are possible to divide the target image data. In that case, the distribution conditions are examples of a first distribution condition. On the other hand, in case of the distribution conditions based on the number of copies, image data for all pages needs to be kept as one piece of data when dividing a print job. Therefore, the distribution conditions based on the number of copies are distribution conditions that are not possible to divide the target image data. In that case, the distribution conditions are examples of a second distribution conditions.

As described above, the second embodiment which generates the divided print jobs before generating the print data and the first embodiment which generates the divided print jobs after the generation of the print data have different advantages. Therefore, in the third embodiment, as with the second embodiment, at first, the distribution determination is executed at arrow J2 shown in FIG. 6, and if it is determined that the distributed printing in accordance with any of the distribution conditions based on the number of pages is possible, that is, if any of the distribution conditions that are possible to divide image data is satisfied, the processes on and after the arrow J3 are executed.

Figure 2:
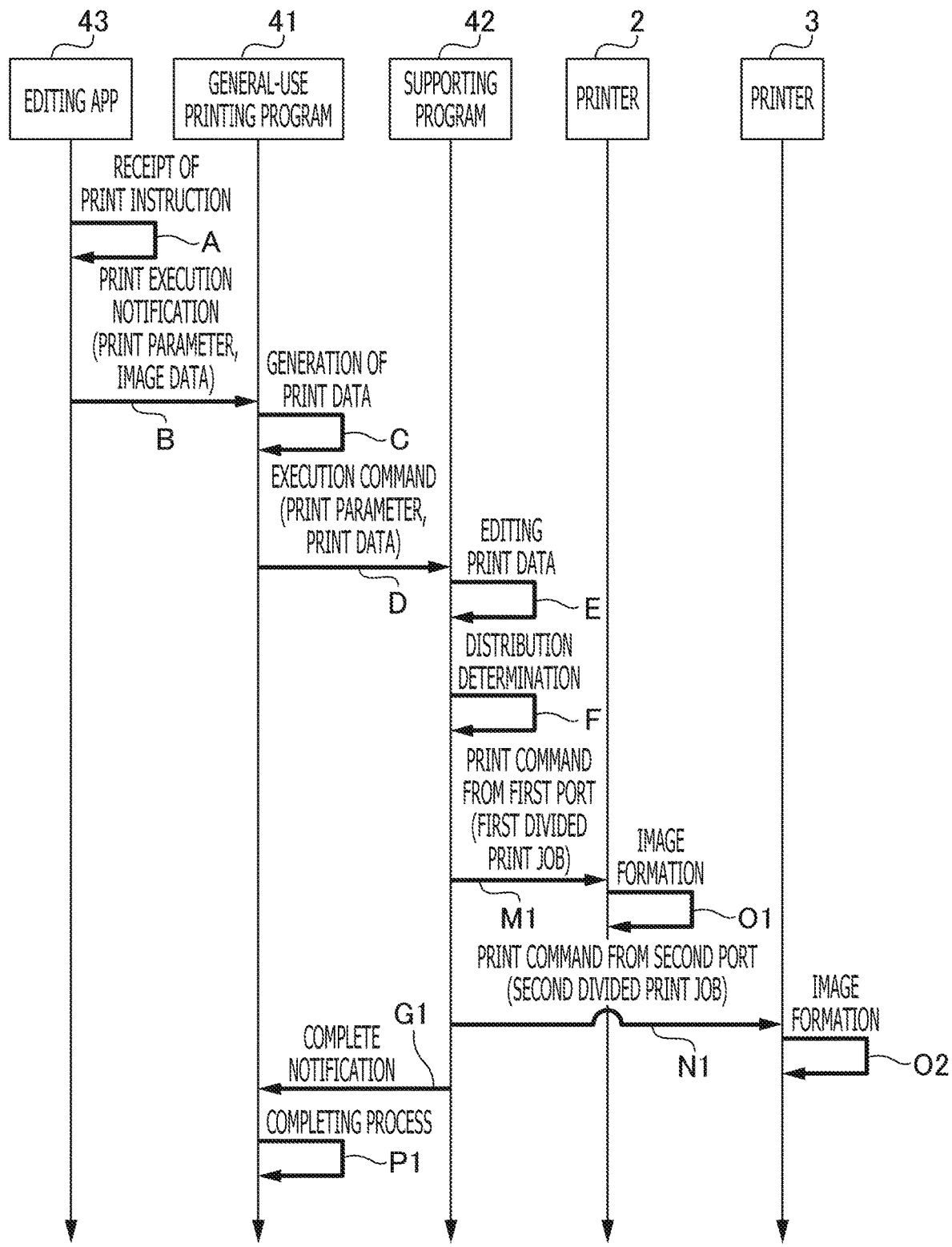
FIG. 2 is a sequential chart showing an example of an order of printing operations by the print system.

On the other hand, if none of the distribution conditions that are possible to divide image data is satisfied at the arrow J2, the processes at the arrows J3 and K shown in FIG. 6 are not executed but the distribution determination of the arrow F shown in FIG. 2 is executed by the same control as the first embodiment. In that case, the print data may be generated at the arrow C prior to executing the arrow F, and the supporting program 42 may execute the distribution determination based on the print data. Then, if it is determined that the distributed printing in accordance with any of the distribution conditions based on the number of copies is possible at the arrow F, that is, if any of the distribution conditions that are not possible to divide image data is satisfied, the supporting program 42 divides the print job and executes the processes on and after the arrow M1 shown in FIG. 2. That is, opportunity to execute distribution of the image data can be increased by starting dividing of image data at the arrow J2 shown in FIG. 6 which is before the generation of print data if the image data can be divided at this timing to execute printing of the divided print jobs earlier, and by dividing image data at the arrow F shown in FIG. 2 if the image data cannot be divided at the arrow J2 shown in FIG. 6 but can be divided at the arrow F shown in FIG. 2.

As described above in detail, according to the supporting program 42 of the embodiments, the distribution conditions for distributing a print job based on the print parameters are set, and if any of the distribution conditions are satisfied, the print job is divided and one of the divided print jobs is transmitted to another printer through another port to cause the other printer to execute a part of the print job. Due to this configuration, the distributed printing is executed and it is expected that printing can be completed faster.

Further, the supporting program 42 of the present embodiments inputs the complete notification for terminating the print job to the general-use printing program 41 in case the general-use printing program 41 does not transmit the print data to the printer 2. Therefore, a state where the general-use printing program 41 is waiting for the transmission of the print data can be cancelled and thus double transmission of the print data to the printer 2 can be avoided.

It is noted that the embodiment disclosed in the present specification is only an illustrative example and is not intended to limit aspects of the present disclosures. Accordingly, the technique disclosed in the present specification can be modified or enhanced without departing from aspects of the disclosures. For example, the device connected to the PC 1 need not be limited to the single-function printer but may be any device which has a printing function (e.g., an MFP, a copier, a facsimile machine and the like). Further, the number of printers connected to the PC 1 needs not be limited to that in the illustrated example but may be one or three or more.

Parts of each process described as the process by the general-use printing program 41 in the present embodiments may be a process by the OS 21. Further, the first port that the general-use printing program 41 uses may be the OS 21 or other programs.

In the embodiments, the supporting program 42 is executed by the output of the execution command of the supporting program 42 from the general-use printing program 41. However, the execution condition of the supporting program 42 is not limited to the above. For example, the supporting program 42 may be directly executed by the OS 21 or may be a resident program. If the supporting program 42 is a resident program, the supporting program 42 may execute the aforementioned operations upon receiving execution commands.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the recording medium containing computer-executable instructions realizing a supporting program corresponding to a printer connected to the information processing apparatus,
   wherein the supporting program causing, when executed by the controller, the information processing apparatus to perform a port process including:
      a determination process in response to a general-use printing program implemented in an operating system of the information processing apparatus receiving a print instruction, the determination process being a process of determining whether a distribution condition is satisfied based on one of a print parameter indicated by the print instruction and image data indicating at least one image subjected to be printed by the print instruction, the distribution condition being a condition to execute distributed printing of the image data using a plurality of printers; and
      a distributing process of transmitting a part of a total printing amount of a print job indicated by the print instruction to one printer through a first port of the information processing apparatus and transmitting a remaining part of the total printing amount of the print job to an other printer different from the one printer through a second port of the information processing apparatus, the first port being a port to which the one printer is connected, the second port being a port different from the first port,
   wherein, in the port process, the distributing process is performed when it is determined that the distribution condition is satisfied in the determination process, and the distributing process is not performed when it is determined that the distributing condition is not satisfied, and
   wherein the general-use printing program is configured to transmit a print job through the first port when the general-use printing program receives a print instruction to execute printing without using the supporting program for transmission when it is determined that the distributing process is not performed.

2. The non-transitory computer-readable recording medium according to claim 1,
   wherein, in the distributing process:
      the part of the total printing amount of the print job indicted by the print instruction is transmitted to the one printer through the first port using the supporting program; and
      the remaining part of the total printing amount of the print job to the other printer through the second port using the supporting program.

3. The non-transitory computer-readable recording medium according to claim 1,
   wherein, in the distributing process:
      the part of the total printing amount of the print job indicated by the print instruction is transmitted to the one printer through the first port using the supporting program; and
      the supporting program, as executed by the controller, causing the information processing apparatus to perform a job generating process of generating a new print job to transmit the remaining part of the total printing amount of the print job to the other printer through the second port and providing the new print job for the operating system, the new print job provided for the operating system being transmitted to the other printer through the second port.

4. The non-transitory computer-readable recording medium according to claim 3,
   wherein, in the job generating process:
      the new print job to cause the other printer to execute printing of an image is transmitted to the general-use printing program, the general-use printing program activating an other supporting program corresponding to the other printer and causing the other supporting program to transmit the new print job to the other printer through the second port.

5. The non-transitory computer-readable recording medium according to claim 1,
   wherein the supporting program, as executed by the controller, causing the information processing apparatus to perform an error process when an error is detected during transmission of a print job using the supporting program, the error process being a process of displaying information indicating the error on a display of the information processing apparatus.

6. The non-transitory computer-readable recording medium according to claim 1,
   wherein the supporting program, as executed by the controller, causing the information processing apparatus to perform the port process after the general-use printing program generates print data based on the print instruction.

7. The non-transitory computer-readable recording medium according to claim 1,
wherein the supporting program, as executed by the controller, causing the information processing apparatus to perform the determination process before the general-use printing program generates print data based on the print instruction.

8. The non-transitory computer-readable recording medium according to claim 1,
wherein the supporting program, as executed by the controller, causing the information processing apparatus to perform the determination process before the general-use printing program generates print data based on the print instruction,
wherein the distribution condition includes a first distribution condition and a second distribution condition, the first distribution condition being a condition to divide the image data, the second distribution condition being a condition not to divide the image data,
wherein the supporting program, as executed by the controller, causing the information processing apparatus to perform:
when the first distribution condition is satisfied, dividing the image data into two pieces of image data, causing the general-use printing program to generate two pieces of print data corresponding to the two pieces of image data, respectively, transmitting one of two print jobs, which correspond to the two pieces of print data, respectively, to the one printer through the first port, and transmitting the other of the print job to the other printer through the second port; and
when the second distribution condition is satisfied, after the general-use printing program generates print data, executing the distributing process of a print job corresponding to the print data.

9. The non-transitory computer-readable recording medium according to claim 8,
wherein, in the determining process, it is determined that the second distribution condition is satisfied when setting of printing a plurality of copies of a same image is set to print job corresponding to the print instruction, and
wherein, in the distributing process, the total printing amount of the print job is distributed by a number of copies.

10. The non-transitory computer-readable recording medium according to claim 1,
wherein the supporting program, as executed by the controller, causing the information processing apparatus to perform a first notification process of inputting a first end notification to the general-use printing program when it is determined that the distribution condition is satisfied and when performing the distributing process in which the print job is transmitted without using the general-use printing program, the first end notification being a notification to terminate the print job based on the print instruction, the general-use printing program terminating the print job based the print instruction when receiving the first end notification.

11. The non-transitory computer-readable recording medium according to claim 10,
wherein the supporting program, as executed by the controller, causing the information processing apparatus to perform a second notification process of inputting a second end notification to the general-use printing program when a cancel condition to cancel the print job based on the print instruction is satisfied, the general-use printing program cancelling the print job based the print instruction when receiving the second end notification, the second end notification being different from the first end notification.

12. The non-transitory computer-readable recording medium according to claim 1,
wherein, in the determining process, the distributing condition is satisfied when a particular parameter value is set in the print parameter indicated by the print instruction.

13. The non-transitory computer-readable recording medium according to claim 12,
wherein the print parameter includes a number of copies, and
wherein the particular parameter value is two or more of copies.

14. The non-transitory computer-readable recording medium according to claim 1,
wherein the image data indicates multiple images respectively printed on multiple pages, and
wherein, in the determining process, the distributing condition is satisfied when a number of the multiple pages is more than a particular number of pages.

15. The non-transitory computer-readable recording medium according to claim 1,
wherein the total printing amount indicates a number of printing pages, the printing pages being pages on which the at least one image indicated by the image data is printed in accordance with the print parameter, and
wherein, in the determining process, the distributing condition is satisfied when the number of printing pages is more than a particular number of pages.

16. An information processing apparatus having a controller,
wherein a supporting program corresponding to a printer connected to the information processing apparatus is implemented in the information processing apparatus,
wherein the controller performs a port process including:
a determination process in response to a general-use printing program implemented in an operating system of the information processing apparatus receiving a print instruction, the determination process being a process of determining whether a distribution condition is satisfied based on one of a print parameter indicated by the print instruction and image data indicating at least one image subjected to be printed by the print instruction, the distribution condition being a condition to execute distributed printing of the image data using a plurality of printers; and
a distributing process of transmitting a part of a total printing amount of a print job indicated by the print instruction to one printer through a first port of the information processing apparatus and transmitting a remaining part of the total printing amount of the print job to an other printer different from the one printer through a second port of the information processing apparatus, the first port being a port to which the one printer is connected, the second port being a port different from the first port,
wherein, in the port process, the distributing process is performed when it is determined that the distribution condition is satisfied in the determination process, and the distributing process is not performed when it is determined that the distributing condition is not satisfied, and wherein the general-use printing program is configured to transmit a print job through the first port when the general-use printing program receives a print instruction to execute printing without using the supporting program for transmission when it is determined that the distributing process is not performed.

17. A printing method of controlling an information processing apparatus having a controller, a supporting program corresponding to a printer connected to the information processing apparatus being implemented in the information processing apparatus, wherein the method includes:

causing the printer to perform printing based on print data generated in the information processing apparatus; and in response to a general-use printing program implemented in an operating system of the information processing apparatus receiving a print instruction, determining whether a distribution condition is satisfied based on one of a print parameter indicated by the print instruction and image data indicating at least one image subjected to be printed by the print instruction, the distribution condition being a condition to execute distributed printing of the image data using a plurality of printers; and transmitting a part of a total printing amount of a print job indicated by the print instruction to one printer through a first port of the information processing apparatus and transmitting a remaining part of the total printing amount of the print job to an other printer different from the one printer through a second port of the information processing apparatus, the first port being a port to which the one printer is connected, the second port being a port different from the first port, wherein, the part and the remaining part are transmitted through the first port and the second port, respectively, when it is determined that the distribution condition is satisfied, and the part and the remaining part are not transmitted distributedly when it is determined that the distributing condition is not satisfied, and wherein the general-use printing program transmits a print job through the first port when the general-use printing program receives a print instruction to execute printing without using the supporting program for transmission when it is determined that the distributing process is not performed.

* * * * *